(12) United States Patent
Mandic

(10) Patent No.: US 9,747,309 B1
(45) Date of Patent: Aug. 29, 2017

(54) AUTO-DETERMINING BACKUP LEVEL

(71) Applicant: EMC IP Holding Company LLC, Hopkinton, MA (US)

(72) Inventor: Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 181 days.

(21) Appl. No.: 14/138,520

(22) Filed: Dec. 23, 2013

(51) Int. Cl.
*G06F 17/30* (2006.01)
*G06F 11/14* (2006.01)

(52) U.S. Cl.
CPC .. *G06F 17/30289* (2013.01); *G06F 17/30008* (2013.01); *G06F 11/1451* (2013.01); *G06F 11/1458* (2013.01); *G06F 11/1469* (2013.01)

(58) Field of Classification Search
CPC ........... G06F 17/30008; G06F 11/1458; G06F 11/1451; G06F 11/1469
USPC ................. 707/679, 644–648, 651–654, 682
See application file for complete search history.

(56) References Cited

U.S. PATENT DOCUMENTS

| | | | | |
|---|---|---|---|---|
| 5,720,026 A * | 2/1998 | Uemura | ............... | G06F 11/1451 707/999.202 |
| 5,778,165 A * | 7/1998 | Saxon | ................. | G06F 11/1461 714/4.12 |
| 7,536,424 B2 * | 5/2009 | Barzilai | ............... | G06F 11/1448 |
| 8,117,410 B2 * | 2/2012 | Lu | ....................... | G06F 11/1451 707/625 |
| 8,260,750 B1 * | 9/2012 | Gugick | ............... | G06F 11/1451 707/645 |
| 8,341,122 B2 * | 12/2012 | Sawdon | ............ | G06F 17/30008 707/641 |
| 8,370,304 B2 * | 2/2013 | Sawdon | ............ | G06F 17/30008 707/641 |
| 9,021,222 B1 * | 4/2015 | Sadhu | ................. | G06F 11/1446 711/144 |
| 9,075,754 B1 * | 7/2015 | Sadhu | ................. | G06F 11/1458 |
| 9,507,670 B2 * | 11/2016 | Timashev | ........... | G06F 11/1451 |
| 2003/0177149 A1 * | 9/2003 | Coombs | .............. | G06F 11/1448 |
| 2006/0059384 A1 * | 3/2006 | Helliker | .............. | G06F 11/1464 714/13 |
| 2011/0150567 A1 * | 6/2011 | Colotte | ................... | F01D 25/36 403/361 |
| 2011/0153567 A1 * | 6/2011 | Sawdon | ............ | G06F 17/30008 707/645 |
| 2011/0295811 A1 * | 12/2011 | Cherkasova | ........ | G06F 11/3419 707/654 |
| 2011/0307657 A1 * | 12/2011 | Timashev | ........... | G06F 11/1451 711/112 |
| 2012/0089580 A1 * | 4/2012 | Yamashita | ........ | G06F 17/30345 707/695 |
| 2014/0201162 A1 * | 7/2014 | Kumarasamy | ...... | G06F 11/1469 707/679 |
| 2015/0370645 A1 * | 12/2015 | Dhanalakoti | ....... | G06F 11/1461 707/646 |

* cited by examiner

*Primary Examiner* — Frantz Coby
(74) *Attorney, Agent, or Firm* — Van Pelt, Yi & James LLP

(57) ABSTRACT

A system for auto-determining a backup level comprises an input interface and a processor. The input interface is configured to receive backup information. The processor is configured to determine whether a backup criterion is satisfied, based at least in part on the backup information, and in the event the backup criterion is satisfied, change the backup level.

13 Claims, 6 Drawing Sheets

AUTO-DETERMINING BACKUP LEVEL

BACKGROUND OF THE INVENTION

Traditional backup types are of level 'full' (e.g., backing up all data) or 'incremental' (e.g., backing up only data that has changed since a previous backup) with additional variations introduced by different backup applications. Advanced backup type 'forever incremental' (e.g., making a first full backup and from then on only making incremental backups) synthesizes a full backup on the server-side by combining a previous full with later incremental backups. However, large change rates since an original full backup result in storage that is very fragmented: data is spread over a large number of discontinuous areas, negatively impacting recovery performance.

BRIEF DESCRIPTION OF THE DRAWINGS

Various embodiments of the invention are disclosed in the following detailed description and the accompanying drawings.

DETAILED DESCRIPTION

Figure 1:
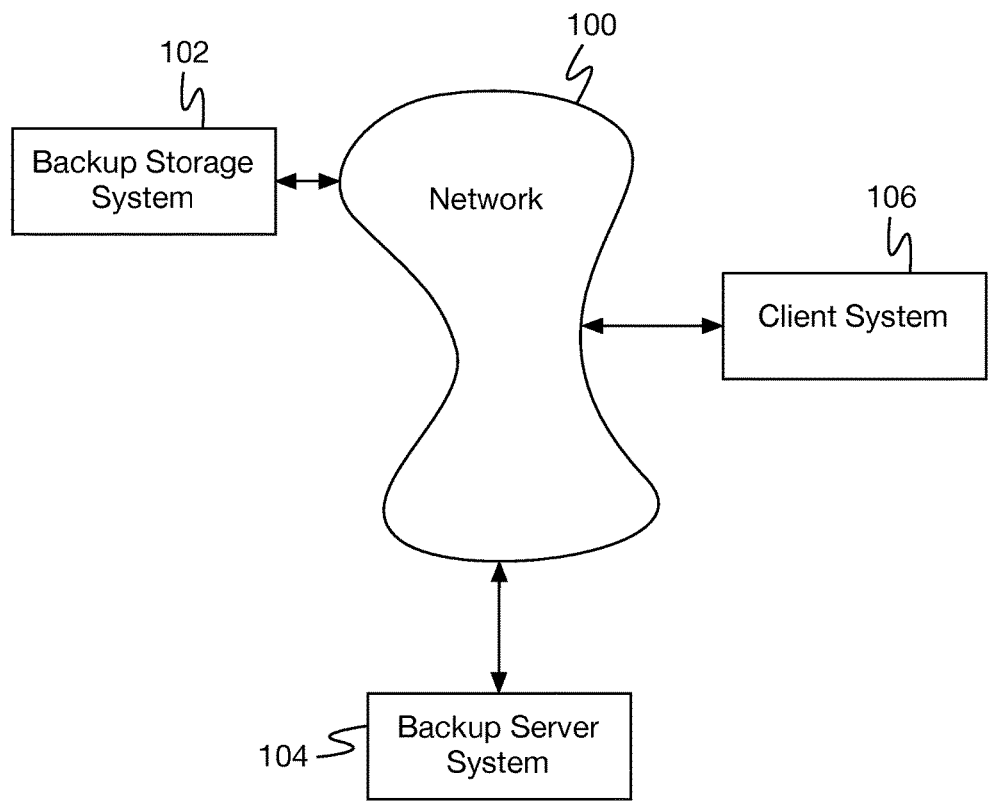
FIG. 1 is a block diagram illustrating an embodiment of a system for auto-determining a backup level.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for auto-determining a backup level is disclosed. A system for auto-determining a backup level comprises an input interface and a processor. The input interface is configured to receive backup information. The processor is configured to determine whether a backup criterion is satisfied, based at least in part on the backup information, and in the event the backup criterion is satisfied, change the backup level. The system for auto-determining a backup level additionally comprises a memory coupled to the processor and configured to provide the processor with instructions.

In some embodiments, a backup system comprises a client system (e.g., a system that requires backup up) and a backup storage system (e.g., a system for storing backup data). The system performs both full backups (e.g., copying all data from the client system to the backup storage system) and incremental backups (e.g., copying only data that has changed since the last backup from the client system to the storage system). Incremental backups consume significantly fewer resources and storage space than full backups, however, they complicate the process of disaster recovery. Each incremental backup increases the fragmentation of the data stored on the backup storage system (e.g., rather than the backup data being stored in a continuous region of the storage system as in a full backup, it is stored in many small regions scattered throughout the storage system) and lengthens the time necessary to perform a recovery. It is therefore necessary to perform a full backup periodically. The system for auto-determining a backup level determines if a particular backup operation should be a full backup or an incremental backup.

In some embodiments, the system for auto-determining a backup level determines that a backup operation should be a full backup if steady state values indicate to make a full backup or if a backup criterion indicates to make a full backup. The steady state values comprise values of system variables that are not expected to change under normal operation of the system (e.g., operating system version, version of a database, etc.). If more than a threshold number of steady state values have changed, it is taken by the system as an indication that a major modification to the system has occurred, and a full backup is then required to ease restoration due to significant number of changes leading to fragmentation of the backup. The backup criterion comprises one or more of the following: a file change rate criterion, a data change rate criterion, a fragmentation level criterion, or a criterion designed to determine when enough changes have occurred since the last full backup so that another one is required, or any other appropriate criterion.

FIG. 1 is a block diagram illustrating an embodiment of a system for auto-determining a backup level. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, client system 106 comprises a client system (e.g., a computing system for operation by a user). In some embodiments, client system 106 comprises a system accessed by a user directly (e.g., the user is in proximity with client system 106). In some embodiments, client system 106 comprises a system accessed by a user remotely (e.g., the user is not in proximity with client system 106, and accesses client system 106 via network 100 and a separate user system). Client system 106 comprises a system running enterprise software (e.g., business software for creating data, storing data, transmitting data, receiving data, etc.). In some embodiments, client system 106 comprises a system for storing data on a backup system or retrieving stored data from a backup system. In various embodiments, there are 1, 4, 17, 22, 1459, or any other appropriate number of client systems communicating with network 100. Backup storage system 102 comprises a computer system for backing up data. Backup system 102 backs up data stored on client system 106. In various embodiments, backup system 102 performs full backups of the data on client system 106 (e.g., makes complete copies of the data), performs incremental backups of the data on client system 106 (e.g., makes copies of data modified since the last backup), performs a combination of full and incremental backups of the data on client system 106, or performs any other appropriate kind of backup. In some embodiments, data stored on backup system 102 comprises deduplicated backup data (e.g., data is stored in such a way that multiple copies of the same data are only stored a single time). In some embodiments, deduplicated backup data is segmented (e.g., broken into chunks which can then be compared to determine duplicate data). In some embodiments, deduplicated backup data is segmented using a hash function (e.g., a hash function is used to determine where to divide data into segments). In various embodiments, there are 1, 2, 7, 12, 45, 138, or any other appropriate number of backup storage systems communicating with network 100. Backup server system 104 comprises a server system for controlling backup storage system 102 and client system 106. In various embodiments, backup server system 104 issues commands to backup storage system 102 and client system 106, reads status information from backup storage system 102 and client system 106, determines response times of backup storage system 102 and client system 106, or performs any other backup server system action. In some embodiments, backup server system 104 is operated by a system administrator (e.g., an administrator maintaining the network backup system). In some embodiments, backup server system 104 is accessed by a system administrator using an external management console communicating with backup server system 104 via network 100. In some embodiments, a system administrator using an external management console can access multiple backup server systems on multiple networked backup systems.

Figure 2:
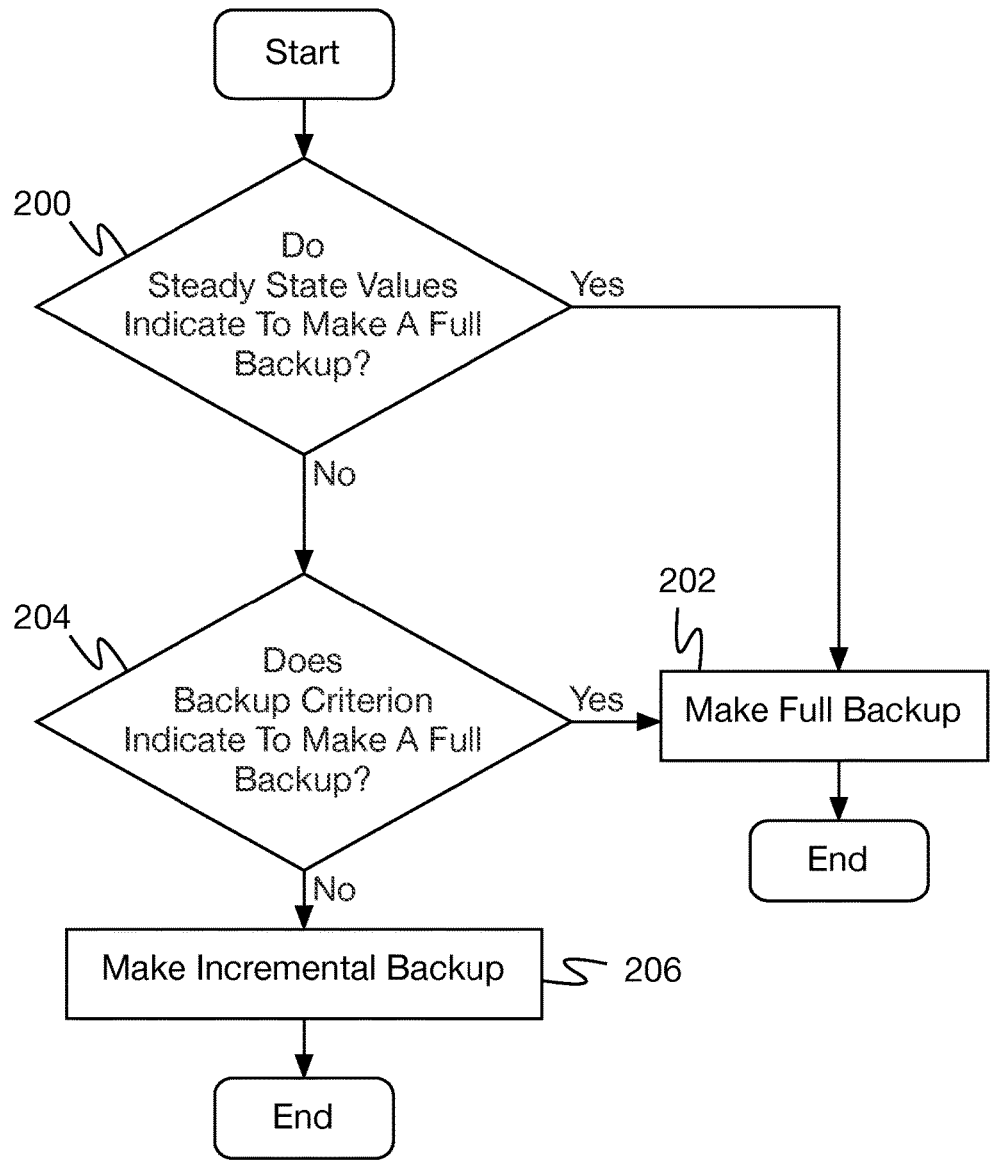
FIG. 2 is a flow diagram illustrating an embodiment of a process for determining whether to make a full backup or an incremental backup.

FIG. 2 is a flow diagram illustrating an embodiment of a process for determining whether to make a full backup or an incremental backup. In some embodiments, the backup comprises backing up data on a client system (e.g., client system 106 of FIG. 1) to a backup storage system (e.g., backup storage system 102 of FIG. 1). A full backup comprises backing up all designated data on the client system to the backup storage system. An incremental backup comprises backing up only data on the client system that has changed in the designated data set since a previous backup (full or incremental) to the backup storage system. In some embodiments, the process of FIG. 2 is performed by the client system, e.g., to determine whether it should send all of its data to the backup storage system. In some embodiments, the process of FIG. 2 is performed by the backup storage system, e.g., to determine whether it should request the client system to send all of its data. In some embodiments, the process of FIG. 2 is performed by the backup server system, e.g., to determine whether it should indicate to the client system to send all of its data to the backup storage system. In some embodiments, the process of FIG. 2 is performed in response to a determination that it is time to back up data. In various embodiments, a determination that it is time to back up data is made according to a calendar, by determining an amount of time since the last backup, by determining an amount of data modified since the last backup, by determining a number of files modified since the last backup, by determining a number of blocks modified since the last backup, or according to any other appropriate criteria. In various embodiments, a determination that it is time to back up data is made by the client system, by the backup storage system, by the backup server system, or by any other appropriate system. In the example shown, in 200, it is determined whether steady-state values indicate to make a full backup. In some embodiments, steady-state values comprise values of system state (e.g., operating system version, amount of memory, hard drive size, etc.) that are not expected to change under normal routine operation of the system. In some embodiments, the steady-state values indicate to make a full backup if more than a threshold number of them have changed (e.g., there has been a major change to the system). If it is determined in 200 that the steady-state values indicate to make a full backup, control passes to 202. In 202, a full backup is made, and the process ends. In some embodiments, the making of the full backup comprises performing a full backup by storing a copy of all files designated to be backed up on a backup storage system or storage location. If it is determined in 200 that the steady-state values do not indicate to make a full backup, control passes to 204. In 204, it is determined whether a backup criterion indicates to make a full backup. In various embodiments, a backup criterion comprises a file change rate, a data change rate, a fragmentation level, or any other appropriate backup criterion. If it is determined in 204 that the backup criterion indicates to make a full backup, control passes to 202. If it is determined in 204 that the backup criterion does not indicate to make a full backup, control passes to 206. In 206, an incremental backup is made. In some embodiments, the making of the incremental backup comprises performing an incremental backup by storing a copy of changed files since a last incremental or full backup that were designated to be backed up on a backup storage system or storage location.

Figure 3:
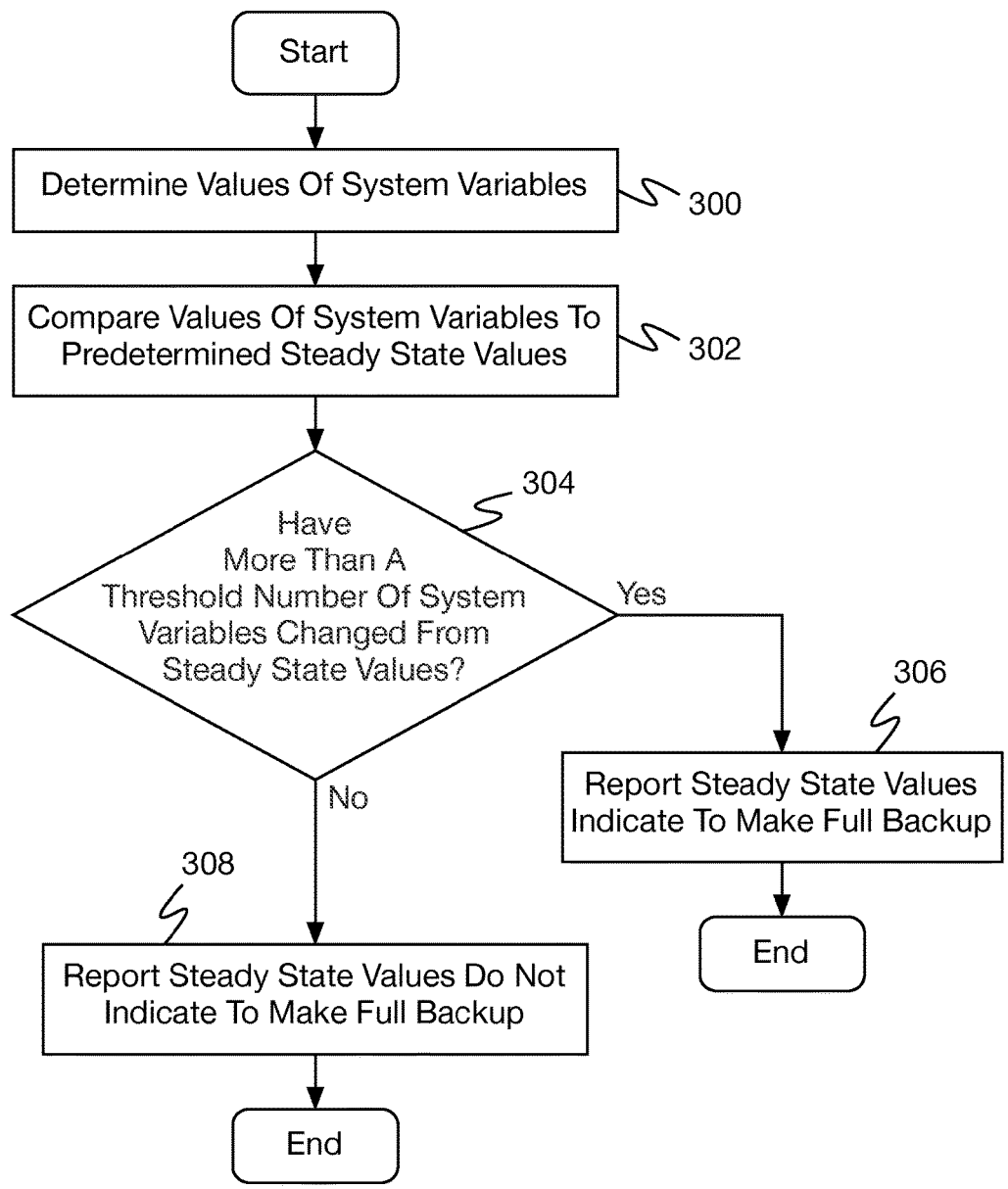
FIG. 3 is a flow diagram illustrating an embodiment of a process for determining whether steady state values indicate to make a full backup.

FIG. 3 is a flow diagram illustrating an embodiment of a process for determining whether steady state values indicate to make a full backup. In some embodiments, the process of FIG. 3 implements 200 of FIG. 2. In the example shown, in 300, values of system variables are determined. In various embodiments, system variables comprise operating system version, hard drive size, memory size, or any other appropriate system variables. In 302, the values of the system variables are compared to predetermined steady state values. In some embodiments, each system variable has an associated stored value that it is compared with. In some embodiments, comparing the values of system variables to predetermined steady state values comprises determining if the system variables are equal to the predetermined steady state values. In some embodiments, a predetermined steady state value additionally comprises a comparison operator (e.g., less than, greater than or equal to, etc.), and comparing the value of the system variable to the predetermined steady state value is performed according to the comparison operator. In 304, it is determined whether more than a threshold number of system variables have changed from their steady state values. In some embodiments, it is determined whether more than a threshold number of system variables do not satisfy their stored comparison. If it is determined in 304 that more than a threshold number of system variables have changed from their steady state values, control passes to 306. In 306, it is reported (e.g., to the process of FIG. 2) that the steady state variables indicate to make a full backup, and the process ends. In some embodiments, reporting that the steady state variables indicate to make a full backup comprises changing the backup level to a full backup level (e.g., or not an incremental level)—for example, indicating that using a message to or indicator to indicate that a full backup level is designated. If it is determined in 304 that more than a threshold number of system variables have not changed from the steady state values, control passes to 308. In 308, it is reported (e.g., to the process of FIG. 2) that the steady state values do not indicate to make a full backup. In some embodiments, reporting that the steady state variables indicate to not make a full backup (e.g., or to make an incremental backup) comprises changing the backup level to an incremental backup level—for example, indicating that using a message to or indicator to indicate that an incremental backup level is designated.

Figure 4:
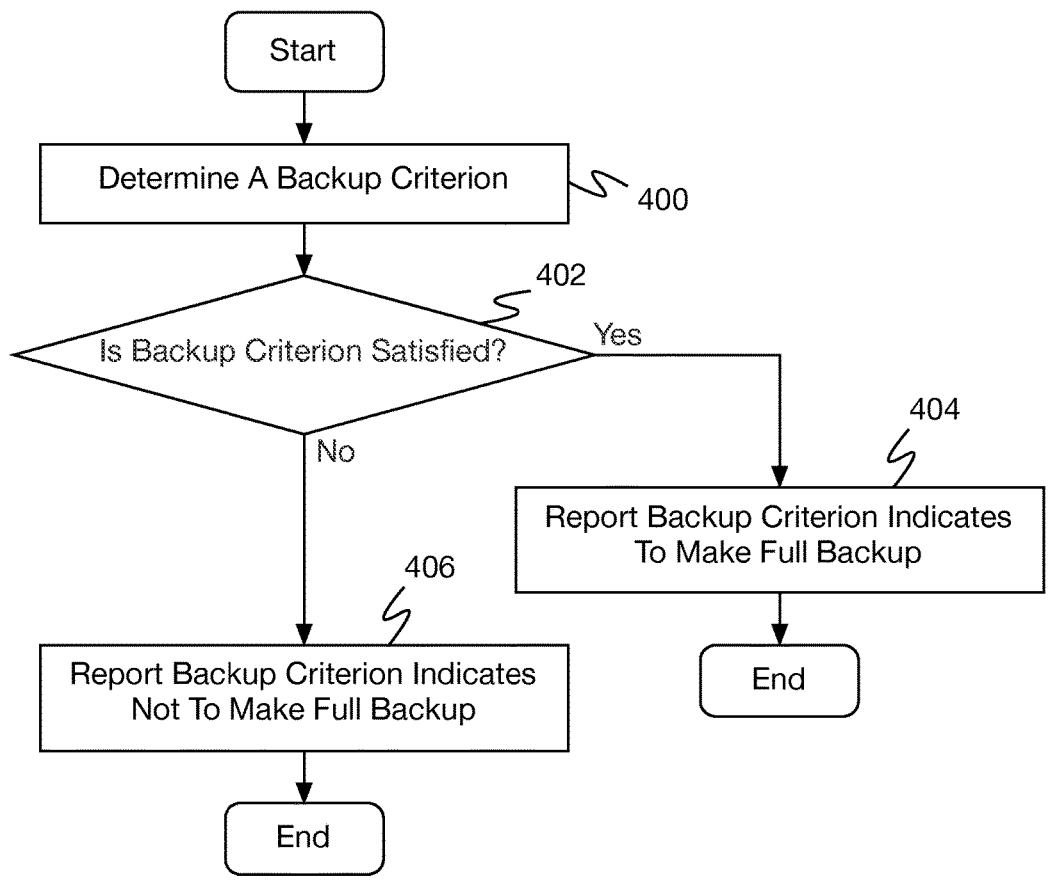
FIG. 4 is a flow diagram illustrating an embodiment of a process for determining whether a backup criterion indicates to make a full backup.

FIG. 4 is a flow diagram illustrating an embodiment of a process for determining whether a backup criterion indicates to make a full backup. In some embodiments, the process of FIG. 4 implements 204 of FIG. 2. In the example shown, in 400, a backup criterion is determined. In various embodiments, a backup criterion comprises a file change rate, a data change rate, a fragmentation level, or any other appropriate backup criterion. In some embodiments, a backup criterion comprises multiple backup criteria joined by Boolean conjunctions (e.g., 'AND', 'OR', 'NAND', 'NOR', 'XOR', 'NOT', etc.). In 402 it is determined whether a backup criterion is satisfied. In some embodiments, determining whether a backup criterion is satisfied comprises comparing the backup criterion with a threshold. In various embodiments, in the event the backup criterion comprises a data change rate, the data change rate threshold comprises 10% (e.g., 10% of stored data, e.g., the sum of modified files or blocks, has changed since the last full backup), 30%, 50%, 75%, or any other appropriate data change rate threshold. In various embodiments, in the event the backup criterion comprises a file change rate, the file change rate threshold comprises 10% (e.g., 10% of files have changed since the last full backup), 20%, 30%, 50%, 60%, or any other appropriate file change rate threshold. In various embodiments, in the event the backup criterion comprises a fragmentation level, the fragmentation level threshold comprises 10 GB (e.g., an average fragment size, e.g., the full backup size divided by the number of data discontinuities, is less than 10 GB or a number of fragments per a unit of data (e.g., 3 per 10 GB)), 5 GB, 1 GB, 500 MB, or any other appropriate fragmentation level threshold. In the event it is determined in 402 that the backup criterion is satisfied, control passes to 404. In 404, it is reported (e.g., to the process of FIG. 2) that the backup criterion indicates to make a full backup, and the process ends. In some embodiments, reporting that the backup criterion indicates to make a full backup comprises changing the backup level (e.g., or to not make an incremental backup). In the event it is determined in 402 that the backup criterion is not satisfied, control passes to 406. In 406, it is reported (e.g., to the process of FIG. 2) that the backup criterion indicates not to make a full backup. In some embodiments, reporting that the backup criterion indicates not to make a full backup comprises changing the backup level (e.g., or to make a full backup).

Figure 5:
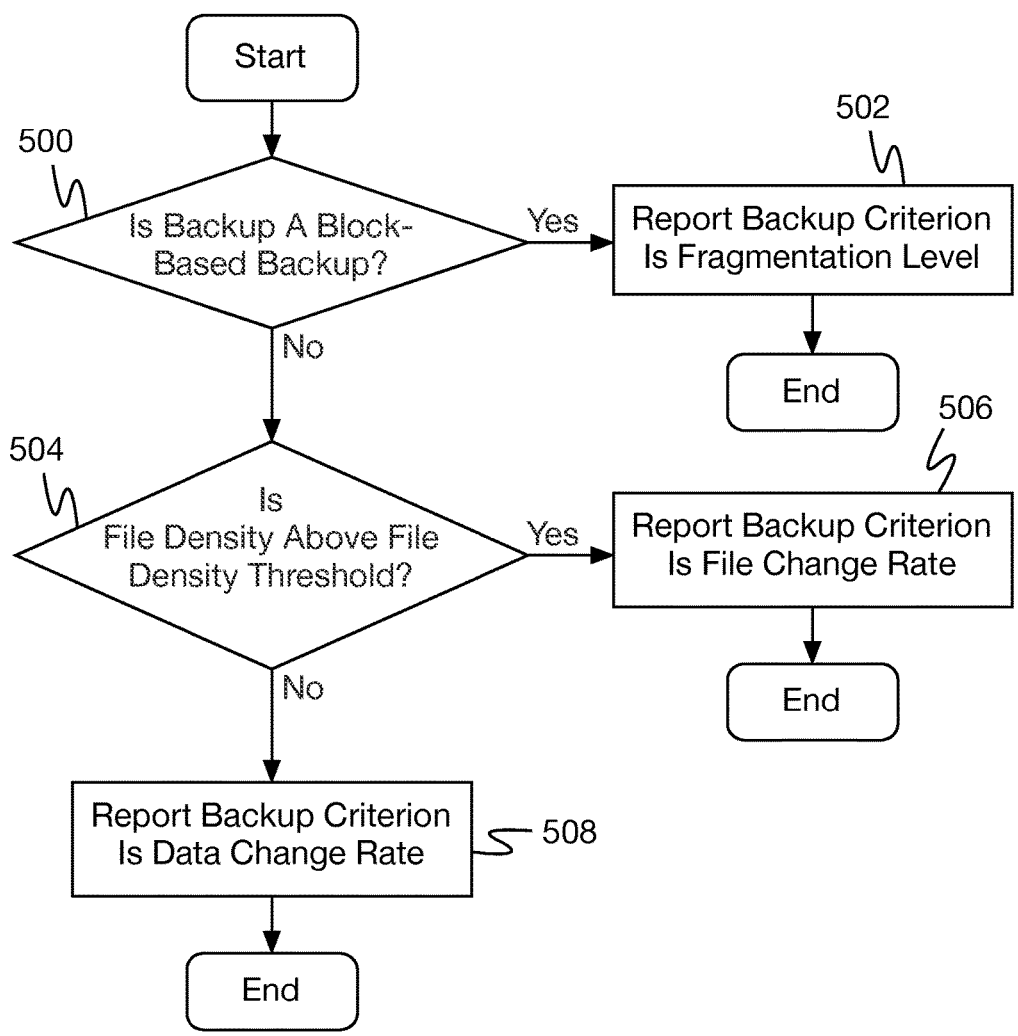
FIG. 5 is a flow diagram illustrating an embodiment of a process for determining a backup criterion.

FIG. 5 is a flow diagram illustrating an embodiment of a process for determining a backup criterion. In some embodiments, the process of FIG. 5 implements 400 of FIG. 4. In the example shown, in 500, it is determined whether the backup is a block-based backup. In various embodiments, it is determined whether the backup is a block-based backup by querying the backup software, by checking system settings, by querying the backup storage system, or in any other appropriate way. If it is determined in 500 that the backup is a block-based backup, control passes to 502. In 502, it is reported (e.g., to the process of FIG. 4) that the backup criterion is fragmentation level, and the process ends. For example, reporting that the backup criterion is fragmentation level comprises indicating that the backup criterion comprises using a fragmentation level. If it is determined in 500 that the backup is not a block-based backup, control passes to 504. In 504 it is determined whether the file density is above a file density threshold. In some embodiments, the file density is determined by dividing the number of files to back up by total number of files in a full backup (e.g., as determined by a previous backup or a current backup file count). In various embodiments, the number of files is determined by counting the files on the client system, by counting the files on a backup storage system, by querying a backup storage system catalog, or in any other appropriate way. In various embodiments, the file density threshold comprises 1/GB, 10/GB, 100/GB, 1000/GB, 10000/GB, 100000/GB, or any other appropriate file density threshold. If it is determined in 504 that the file density is above the file density threshold, control passes to 506. In 506, it is reported (e.g., to the process of FIG. 4) that the backup criterion is a file change rate, and the process ends. For example, reporting that the backup criterion is a file change rate comprises indicating that the backup criterion comprises using a file change rate. If it is determined in 504 that the file density is not above a file density threshold, control passes to 508. In 508, it is reported (e.g., to the process of FIG. 4) that the backup criterion is a data change rate. For example, reporting that the backup criterion is data change rate comprises indicating that the backup criterion comprises a size of all modified files or blocks divided by the size of the complete backup.

Figure 6:
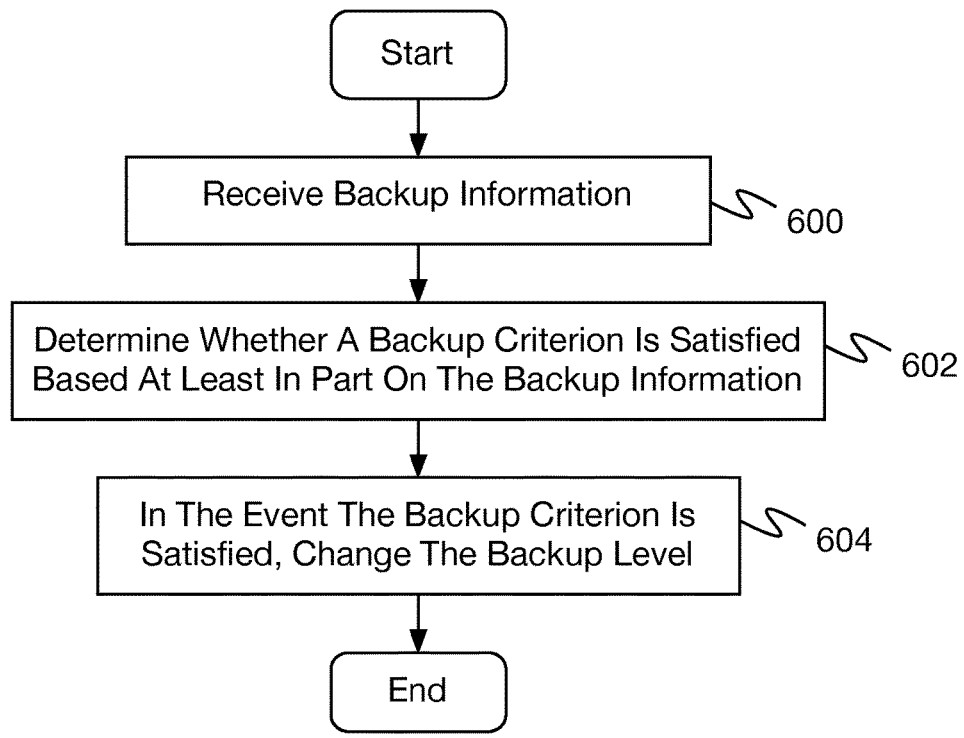
FIG. 6 is a flow diagram illustrating an embodiment of a process for auto-determining a backup level.

FIG. 6 is a flow diagram illustrating an embodiment of a process for auto-determining a backup level. In the example shown, in 600, backup information is received. In various embodiments, backup information comprises values of system variables, a file change rate, a data change rate, a fragmentation level, threshold values, or any other appropriate backup information. In 602, it is determined whether a backup criterion is satisfied based at least in part on the backup information. In 604, in the event the backup criterion is satisfied, the backup level is changed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for auto-determining a backup level, comprising:
   an input interface configured to receive backup information; and
   a processor configured to:

compare values of a plurality of system variables with predetermined steady state values, wherein each system variable of the plurality of system variables has a corresponding predetermined steady state value, wherein the plurality of system variables correspond to variables of system state that are expected to be consistent under normal operation of the system and a threshold number of the system variables changing from their corresponding predetermined steady state indicating a significant modification to the system;

determine whether more than the threshold number of the system variables have changed from their corresponding predetermined steady state values, wherein in the event more than the threshold number of the system variables have changed from their corresponding predetermined steady state values, change the backup level from performing an incremental backup to a full backup;

in the event more than the threshold number of system variables have not changed from their corresponding predetermined steady state values, determine whether a backup criterion is satisfied, based at least in part on the backup information; and in the event the backup criterion is satisfied, change the backup level from performing the incremental backup to the full backup.

2. The system of claim 1, wherein the backup criterion comprises a file change rate being greater than a file change rate threshold.

3. The system of claim 2, wherein the file change rate comprises a number of new files divided by a number of files in a backup.

4. The system of claim 1, wherein the backup criterion comprises a data change rate being greater than a data change rate threshold.

5. The system of claim 4, wherein the data change rate comprises a sum of modified files or blocks divided by the size of a backup.

6. The system of claim 1, wherein the backup criterion comprises a fragmentation level being greater than a fragmentation level threshold.

7. The system of claim 6, wherein the fragmentation level comprises a size of a full backup divided by a number of data discontinuities.

8. The system of claim 1, wherein the processor is further configured to determine whether a backup is a block-based backup.

9. The system of claim 8, wherein the processor is further configured to:

in the event the backup is a block-based backup, determine that the backup criterion comprises a fragmentation level being greater than a fragmentation level threshold.

10. The system of claim 1, wherein the processor is further configured to determine whether a backup comprises a high density of files.

11. The system of claim 10, wherein the processor is further configured to:

in the event the backup comprises a high density of files, determine that the backup criterion comprises a file change rate being greater than a file change rate threshold.

12. A method for auto-determining a backup level, comprising:

receiving backup information;

comparing, using a processor, values of a plurality of system variables with predetermined steady state values, wherein each system variable of the plurality of system variables has a corresponding predetermined steady state value, wherein the plurality of system variables correspond to variables of system state that are expected to be consistent under normal operation of a system and a threshold number of the system variables changing from their corresponding predetermined steady state indicating a significant modification to the system;

determining whether more than the threshold number of the system variables have changed from their corresponding predetermined steady state values, wherein in the event more than the threshold number of the system variables have changed from their corresponding predetermined steady state values, changing the backup level from performing an incremental backup to a full backup;

in the event more than the threshold number of system variables have not changed from their corresponding predetermined steady state values, determining, using the processor, whether a backup criterion is satisfied, based at least in part on the backup information; and in the event the backup criterion is satisfied, changing the backup level from performing the incremental backup to the full backup.

13. A computer program product for auto-determining a backup level, the computer program product being embodied in a non-transitory computer readable storage medium and comprising computer instructions for:

receiving backup information;

comparing values of a plurality of system variables with predetermined steady state values, wherein each system variable of the plurality of system variables has a corresponding predetermined steady state value, wherein the plurality of system variables correspond to variables of system state that are expected to be consistent under normal operation of the system and a threshold number of the system variables changing from their corresponding predetermined steady state indicating a significant modification to the system;

determining whether more than the threshold number of the system variables have changed from their corresponding predetermined steady state values, wherein in the event more than the threshold number of the system variables have changed from their corresponding predetermined steady state values, changing the backup level from performing an incremental backup to a full backup;

in the event more than the threshold number of system variables have not changed from their corresponding predetermined steady state values, determining whether a backup criterion is satisfied, based at least in part on the backup information; and in the event the backup criterion is satisfied, changing the backup level from performing the incremental backup to the full backup.

\* \* \* \* \*